United States Patent
Uchida

(10) Patent No.: US 7,232,267 B2
(45) Date of Patent: Jun. 19, 2007

(54) INFORMATION PROCESSING APPARATUS, INFORMATION PROCESSING METHOD, AND CONTROL PROGRAM

(75) Inventor: Tatsuro Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 631 days.

(21) Appl. No.: 10/825,229

(22) Filed: Apr. 16, 2004

(65) Prior Publication Data

US 2004/0212829 A1   Oct. 28, 2004

(51) Int. Cl.
*B41J 5/30* (2006.01)
(52) U.S. Cl. .................................... 400/62; 358/1.15
(58) Field of Classification Search ................ 400/62; 358/1.15

See application file for complete search history.

(56) References Cited

U.S. PATENT DOCUMENTS

| | | | | |
|---|---|---|---|---|
| 6,493,101 | B1 * | 12/2002 | Okazawa | 358/1.15 |
| 6,607,314 | B1 * | 8/2003 | McCannon et al. | 400/62 |
| 2004/0213614 | A1 | 10/2004 | Uchida | 400/62 |

\* cited by examiner

*Primary Examiner*—Minh Chau
(74) *Attorney, Agent, or Firm*—Fitzpatrick, Cella, Harper & Scinto

(57) ABSTRACT

As an example of embodiments, there is disclosed a peripheral device control method of realizing a function designated by the user by controlling a peripheral device. The method has an installation function information obtaining step of obtaining installation function information showing what functions have been installed or what functions are not installed among functions which are realized by communicating with the peripheral device, a display control step of controlling a process to display the installed functions or/and the functions which are not installed so that they can be discriminated by using the installation function information obtained in the installation function information obtaining step, a receiving step of receiving an instruction of addition, updating, or deletion of the functions displayed by the displaying process which is controlled in the display control step, and a function managing step of executing at least one of a process to add and validate the function received in the receiving step, a process to delete and invalidate the designated function, and a process to update the function as an updating target to another designated function and validate such another designated function in accordance with the instruction received in the receiving step.

22 Claims, 10 Drawing Sheets

FIG. 6

FUNCTION INFORMATION 760

| NAME | ID | REVISION | LOCATION | RELATED FILE | STATUS | CORRESPONDING MODEL |
|---|---|---|---|---|---|---|
| FUNCTION A | 1011 | 1.00 | C:¥xxx¥yyy | Aa0, Aa2, ... | ENABLE | A, A1, B, C |
| FUNCTION B | 1012 | 1.00 | ¥¥Serva¥... | B0, B1, B2, ... | ENABLE | ANY |
| FUNCTION B | 1012 | 1.01 | www.prnfunc | AAA1, AAA5 | DISABLE | A, D |
| FUNCTION C | 1013 | 1.00 | ¥¥ServC¥... | C1, C2, C3, ... | DISABLE | A, C, D |
| ... | ... | ... | ... | ... | ... | ... |

| DRIVER MANAGEMENT TABLE | |
|---|---|
| PLUG-IN MODULE 1201 | CANNOT BE CALLED |
| PLUG-IN MODULE 1202 | CAN BE CALLED |

INFORMATION PROCESSING APPARATUS, INFORMATION PROCESSING METHOD, AND CONTROL PROGRAM

BACKGROUND OF THE INVENTION

1. Field of the Invention

The invention relates to a peripheral device control apparatus, a user interface, a peripheral device control method, a computer program, and a computer-readable recording medium.

2. Related Background Art

Hitherto, a method called "version-up" has generally and widely been used as a method of adding and updating functions of a printer driver.

There is also used a method whereby by additionally installing an additional module by using a dedicated installer, a function is added to an existing printer driver or functions of the existing printer driver are updated.

As mentioned above, hitherto, the function has been added to the printer driver or the functions of the printer driver have been updated by constructing the driver as a module and installed. However, the module to be installed is a module which is inevitably highly independent.

Further, there is no particularly effective method of deleting the functions which already exist in the printer driver. As an exception, only when a driver set in which a GUI for using the function has been masked exists, the driver in which such a function has been masked can be used. There is also a case where the function added by additional installation is uninstalled by activating the foregoing dedicated installer.

However, according to such version-up means, in order to expand the functions of the printer driver by adding a new module to the printer driver module, it is necessary to recompile the new module or reinstall and reactivate it.

As mentioned above, if the version-up means is used, the recompilation and reactivation have to be performed each time the functions of the printer driver are expanded, so that it is very inconvenient.

Further, in the case of adding and updating the function, if the version-up means is used, the existing printer driver which operates without any problem is replaced with the printer driver of a new version.

That is, in exchange for such an advantage that several functions are added and errors are corrected by the printer driver of the new version, the user has to accept the whole operation specification of the printer driver of the new version.

Therefore, in dependence on circumstances, a possibility that a slight difference is caused between a print result of the existing printer driver and that of the printer driver of the new version can be considered and it largely disadvantages the user.

Further, it is also possible that the introduced printer driver of the new version influences another existing family driver.

SUMMARY OF THE INVENTION

Although methods of deleting specific functions can be realized in some exceptional cases, they are not effective measures.

The invention is made in consideration of the foregoing problems and it is an object of the invention to enable functions which are realized upon printing to be properly added, updated, and deleted.

For example, according to an embodiment, there is disclosed a peripheral device control method of realizing a function designated by the user by controlling a peripheral device, comprising: an installation function information obtaining step of obtaining installation function information showing what functions have been installed or what functions are not installed among functions which are realized by communicating with the peripheral device; a display control step of controlling a process to display the installed functions or/and the functions which are not installed so that they can be discriminated by using the installation function information obtained in the installation function information obtaining step; a receiving step of receiving an instruction of addition, updating, or deletion of the functions displayed by the displaying process which is controlled in the display control step; and a function managing step of executing at least one of a process to add and validate the function received in the receiving step, a process to delete and invalidate the designated function, and a process to update the function as an updating target to another designated function and validate such another designated function in accordance with the instruction received in the receiving step.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 6 shows the embodiment of the invention and is a diagram showing an example of specific contents of function information;

DETAILED DESCRIPTION OF THE PREFERRED EMBODIMENTS

A preferred embodiment of the invention will be described hereinbelow with reference to the drawings. As will be explained hereinbelow, in the embodiment, when addition, updating, and deletion of a function in a printer driver are executed, a change portion to the printer driver is minimized, thereby preventing unexpectedly disadvantaging the user as much as possible, and the user is enabled to easily execute those operations.

Figure 1:
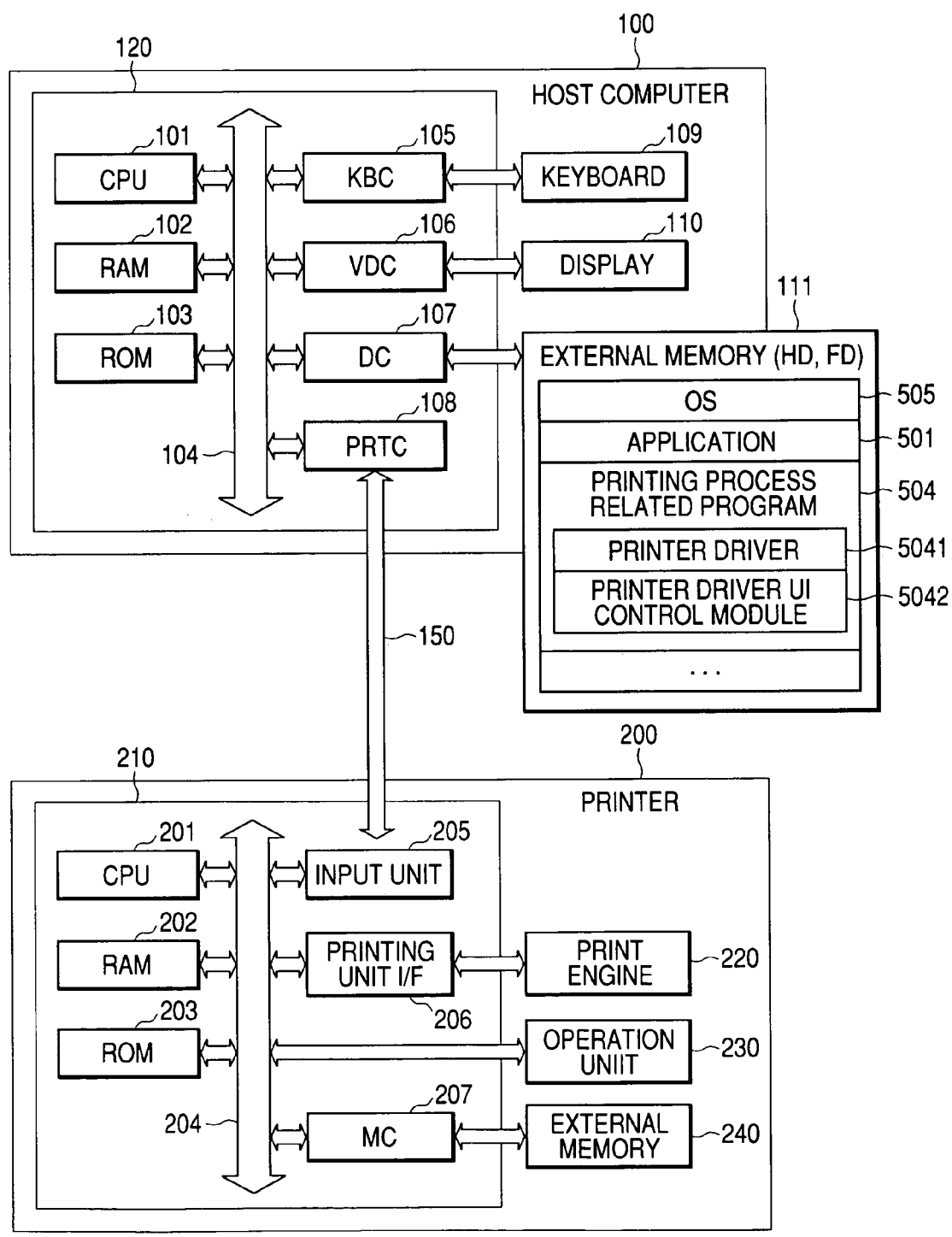
FIG. 1 shows an embodiment of the invention and is a block diagram showing an example of a construction of a printer control system.

FIG. 1 is a block diagram showing an example of a construction of a printer control system using a peripheral device control apparatus as an example of a print control apparatus according to the embodiment. The printer control system according to the embodiment has a host computer 100 and a printer 200.

In the diagram, the host computer 100 comprises: a CPU 101; a RAM 102; a ROM 103; a keyboard controller (KBC) 105; a video controller (VDC) 106; a disk controller (DC) 107; a printer controller (PRTC) 108; a keyboard 109; a display 110; and an external memory 111.

The printer 200 comprises: a CPU 201; a RAM 202; a ROM 203; an input unit 205; a printing unit interface (I/F) 206; a memory controller (MC) 207; a printer engine (print engine) 220; an operation unit 230; an external memory 240; and the like.

First, a construction of each unit of the host computer 100 will be described in detail. The CPU 101 is a central processing unit for integratedly controlling devices connected to a system bus 104. The CPU 101 executes a process of a document in which a figure, an image, characters, a table (including a spreadsheet or the like), and the like exist mixedly on the basis of a document processing program or the like stored in a program area in the ROM 103 or the external memory 111.

The CPU 101 executes, for example, a developing (rasterizing) process of an outline font into display information RAM set in the RAM 102, thereby enabling WYSIWYG (What You See Is What You Get: a function by which an image seen on a display screen of a CRT display can be printed in the same size and shape) on the display 110.

Further, the CPU 101 opens various registered windows on the basis of commands instructed by a mouse cursor (not shown) on the display 110 and executes various data processes.

For example, when the user executes the printing by using the printer 200, he opens the window regarding the print setting and can execute setting of the printer 200 and setting of a print processing method including selection of a print mode to the printer driver.

The RAM 102 functions as a main memory, a work area, or the like of the CPU 101. The ROM 103 is divided into a font area, a program area, and a data area.

The font area or the external memory 111 stores font data or the like which is used in the document process.

The program area or the external memory 111 (the access to them is controlled by the disk controller (DC) 107) is a hard disk (HD), a floppy (registered trademark) disk (FD), or the like. As shown in the diagram, they store not only an operating system program (hereinafter, referred to as "OS") 505, various applications (for example, a document processing application program for executing the process of a document in which a figure, an image, characters, a table, and the like exist mixedly) 501, and a printing process related program 504, but also a user file, an edit file, and the like.

The printing process related program 504 is a program to form print data and can be used in common to a plurality of printers of the same series. The printing process related program 504 includes: a printer control command forming module (hereinafter, referred to as "printer driver") 5041; and a printer driver UI control module 5042. The data area or the external memory 111 stores various data which is used when the document process or the like is executed.

The keyboard controller (KBC) 105 controls a key input from the keyboard 109 or a pointing device (not shown).

The video controller (VDC) 106 controls a display of the display 110.

The disk controller (DC) 107 controls an access to the external memory 111.

A printer controller (PRTC) 108 is connected to the printer 200 via a bidirectional interface 150 and executes a process for controlling communication with the printer 200.

The keyboard 109 has various keys.

The display 110 displays a figure, an image, characters, a table, and the like.

The external memory 111 is constructed by a hard disk (HD), a floppy (registered trademark) disk (FD), or the like. The external memory 111 is used as an area to store a boot program, the OS 505, the various applications 501, the font data, the user file, the edit file, the printing process related program 504 (the printer driver 5041, the printer driver UI control module 5042), and the like.

The foregoing CPU 101, RAM 102, ROM 103, keyboard controller (KBC) 105, video controller (VDC) 106, disk controller (DC) 107, and printer controller (PRTC) 108 are arranged on a computer control unit 120.

A construction of each unit of the printer 200 will now be described in detail. The CPU 201 is a central processing unit for integratedly controlling devices connected to a system bus 204. The CPU 201 outputs an image signal as output information to the print engine 220 on the basis of a control program or the like stored in a program area in the ROM 203 or a control program or the like stored in the external memory 240.

The CPU 201 can execute a process of communication with the host computer 100 via the input unit 205 and can notify the host computer 100 of information or the like in the printer 200.

The RAM 202 functions as a main memory, a work area, or the like of the CPU 201 and a memory capacity can be expanded by an option RAM (not shown) connected to an expansion port.

The RAM 202 is used as an output information developing area, an environment data memory area, an NVRAM (Non-volatile Random Access Memory), or the like.

The ROM 203 is divided into a font area, a program area, and a data area.

The font area stores font data and the like which are used when the output information is formed.

The program area stores a control program and the like of the CPU 201.

When the external memory 240 such as a hard disk or the like is not connected to the printer 200, the data area stores information and the like which are used on the host computer 100.

The input unit 205 executes transmission and reception of data between the printer 200 and the host computer 100 via the bidirectional interface 150.

The printing unit interface (I/F) 206 executes transmission and reception of data between the CPU 201 and the printer engine (print engine) 220.

The memory controller (MC) 207 controls an access to the external memory 240.

The printer engine (print engine) 220 executes the printing operation on the basis of the control of the CPU 201. Specifically speaking, the printer engine 220 is constructed by a conveying mechanism of a recording medium (not shown), a semiconductor laser unit, a photosensitive drum, a developing unit, a fixing unit, a drum cleaning unit, a separating unit, and the like and executes printing by a well-known electrophotographic process.

The operation unit 230 has switches for various operations, display means (for example, an LED display), and the like.

The external memory 240 is constructed by a hard disk (HD), an IC card, or the like and connected as an option to the printer 200.

The external memory 240 stores font data, an emulation program, form data, and the like and its access is controlled by the memory controller (MC) 207.

The external memory 240 is not limited to one memory but a plurality of memories can be provided.

That is, in addition to built-in fonts, a plurality of option cards and a plurality of external memories in each of which a program to interpret printer control languages of different language systems has been stored can be connected to the printer 200.

Further, an NVRAM (not shown) can be also built in the apparatus and printer mode setting information from the operation unit 230 can be also stored in the NVRAM.

The CPU 201, RAM 202, ROM 203, input unit 205, printing unit interface (I/F) 206, and memory controller (MC) 207 are arranged on a printer control unit 210.

Figures 12, 13:
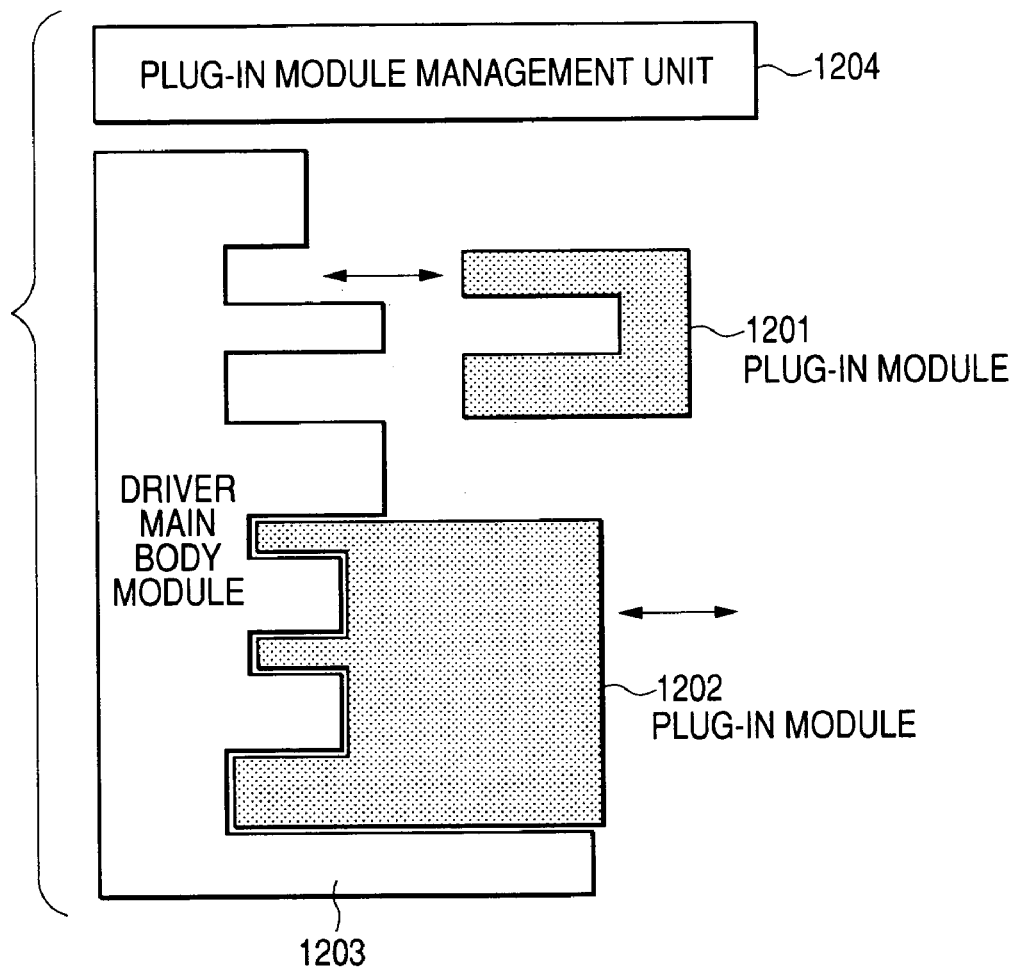
FIG. 12 shows the embodiment of the invention and is a diagram showing an example of a construction of a plug-in module.
FIG. 13 is a diagram showing an example of a driver management module for managing the plug-in module in FIG. 12.

FIG. 12 is a diagram showing an example of a construction of a plug-in module serving as a prerequisite when a print control apparatus of the embodiment is realized.

As mentioned above, in the case of adding and updating the functions to the printer driver, hitherto, the driver has been constructed as a module and installed. However, the module to be installed is a module which is inevitably highly independent.

Therefore, in order to add a new module into the printer driver module and expand the function of the printer driver, it is necessary to recompile the module or reinstall and reactivate it.

In the embodiment, therefore, a plug-in module management unit 1204 as a program to manage a plug-in module is provided as a part of the OS 505 or a part of a driver management application.

In FIG. 12, reference numeral 1203 denotes a driver main body module. Plug-in modules 1201 and 1202 can be attached to or removed from the driver main body module 1203. The print control apparatus of the embodiment is realized by using such a structure as a prerequisite.

For example, the plug-in module management unit 1204 monitors a connecting situation of each of the plug-in modules 1201 and 1202 periodically or when the driver is activated. Information showing which one of the plug-in modules can be called is managed as a table. For example, it is managed by a driver management table as shown in FIG. 13.

The plug-in module management unit 1204 continually monitors the connecting situation of each of the plug-in modules 1201 and 1202 and continually updates the driver management table shown in FIG. 13. When it is recognized that a new plug-in module has been connected, an entry of the driver management table is added. When the plug-in module is deleted, an entry of the plug-in module is deleted. The plug-in module management unit 1204 can be also installed as a part of the printer driver UI control module 5042, which will be explained hereinafter.

By constructing the apparatus as mentioned above, the driver main body module 1203 can grasp which one of the plug-in modules can be called and used at present in a real-time manner. The plug-in modules 1201 and 1202 can be attached or removed any time without recompiling or reactivating them.

Explanation will be made hereinbelow on the assumption that the printer driver 5041 has the construction as mentioned above.

Although the case where the number of plug-in modules which are detachable from the driver main body module 1203 is equal to 2 has been shown as an example in FIG. 12, naturally, the number of plug-in modules which are detachable from the driver main body module 1203 is not limited to 2.

Figure 2:
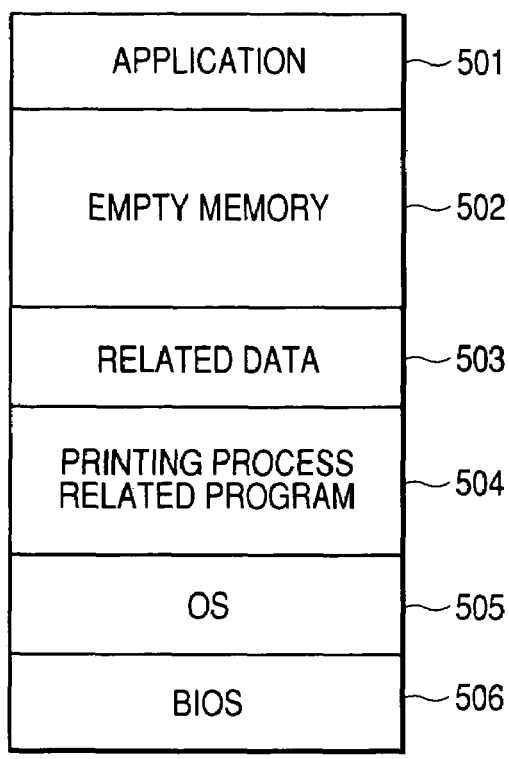
FIG. 2 shows the embodiment of the invention and is a diagram showing an example of a memory map in a RAM loaded into a host computer by activating a printing process related program.

FIG. 2 shows a memory map in the RAM 102 in a state where the predetermined application 501 and the printing process related program 504 in which the printer 200 is used as a control target have been activated and loaded into the RAM 102 on the host computer 100.

As shown in the diagram, in addition to a BIOS (Basic Input Output System) 506 and the OS 505, the application 501, the printing process related program 504, and related data 503 have been loaded in the RAM 102. Further, an empty memory area 502 is also assured in the RAM 102. Thus, the application 501 and the printing process related program 504 enter an executable state.

The printer driver UI control module 5042 in the printing process related program 504 displays print setting display screens 600 and 900 (refer to FIGS. 3 and 8) and a printer function setting display screen 800 (refer to FIG. 10) onto the display (for example, a CRT) 110 in accordance with a print setting command by the user, thereby enabling the setting by the user to be made.

Figure 3:
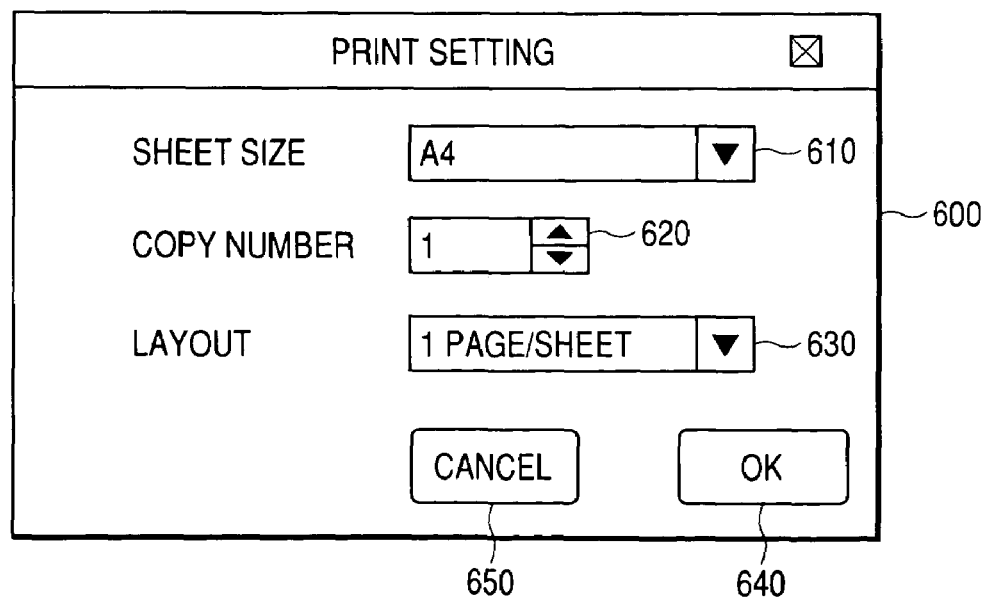
FIG. 3 shows the embodiment of the invention and is a diagram showing a display example of a print setting display screen.

FIG. 3 shows a display example of the print setting display screen 600 as a user interface (UI). In the diagram, a column (pull-down list box) 610 of "sheet size" is used for deciding a size of sheet to be printed. The user can select the size of print sheet by the pull-down list box 610.

A column (copy number spin control box) 620 of "copy number" is used for deciding the number of copies to be printed. The user can input the desired number of print copies by the copy number spin control box 620.

A column (pull-down list box) 630 of "layout" is used for deciding a print style. "1 page/sheet" displayed in the pull-down list box 630 denotes that one print page is printed as it is onto one sheet.

By selecting the pull-down list box 630, "2 pages/sheet" (two pages are reduced and arranged onto one sheet so as not to overlap) and the like are displayed. The user can select a desired print layout as mentioned above.

If the user permits the contents set by using the pull-down list box 610, the copy number spin control box 620, and the pull-down list box 630 as described above, he clicks an OK button 640. On the contrary, to cancel the set contents, the user clicks a cancel button 650.

In the specification, items which can be set by the user as mentioned above are referred to as a "printer function" or simply referred to as a "function". Although the apparatus actually has other many printer functions, they are omitted for simplicity of explanation.

Figure 4:
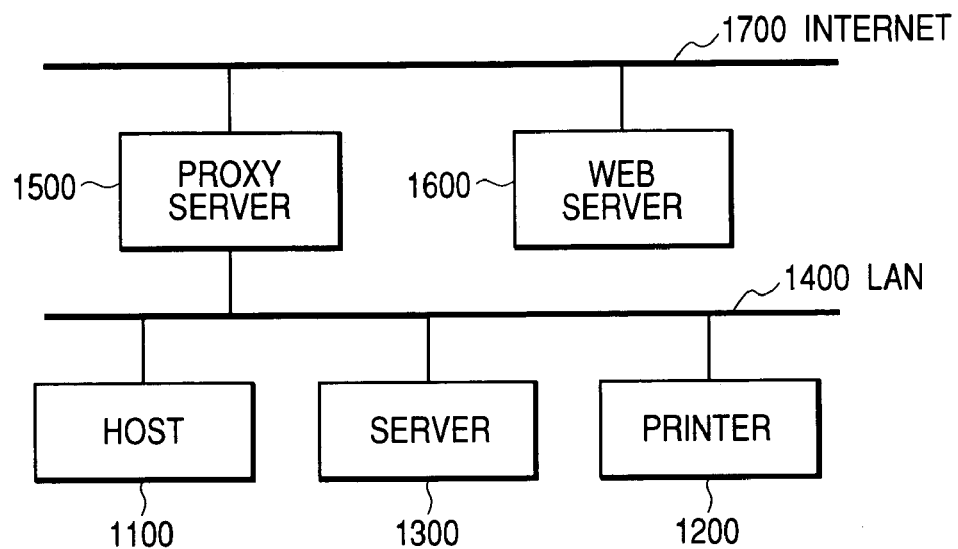
FIG. 4 shows the embodiment of the invention and is a block diagram showing an example of a specific construction of the printer control system.

FIG. 4 is a block diagram showing an example of a specific construction in the printer control system of the embodiment.

In the diagram, a host computer 1100 corresponds to the host computer 100 shown in FIG. 1 and is an information apparatus for adding, updating, and deleting the function of the printer driver 5041.

The host computer 1100 is connected to a printer 1200 as a print target via a LAN (Local Area Network) 1400. The printer 1200 corresponds to the printer 200 shown in FIG. 1.

Although the printer 1200 as a print target is connected to the host computer 1100 via the LAN 1400 in FIG. 4, its connecting form is not particularly limited. For example, the printer 1200 can be connected to a local port or a bus of the host computer 1100.

The printer 1200 can be also connected to a local port or a bus of another host computer existing on the LAN 1400. Further, the printer 1200 can also exist in a network to which a specific server existing on an Internet 1700 belongs.

That is, the printer 1200 can be connected anywhere so long as data can be outputted from the host computer 1100.

The host computer 1100 is connected to another server 1300 via the LAN 1400. It is now assumed that the server 1300 operates as a server which provides the printer function.

Although only one server 1300 in the LAN 1400 which provides the printer function is shown in FIG. 4 for simplicity of explanation, a plurality of servers which provide the printer function can exist.

The host computer 1100 is connected to the Internet 1700 via a proxy server 1500 connected to the LAN 1400. It is assumed that the a Web server 1600 which provides the printer function exists in the Internet 1700.

Although only one Web server 1600 which provides the printer function on the Internet 1700 is shown in FIG. 4 for simplicity of explanation, a plurality of Web servers which provide the printer function can exist.

Figure 5:
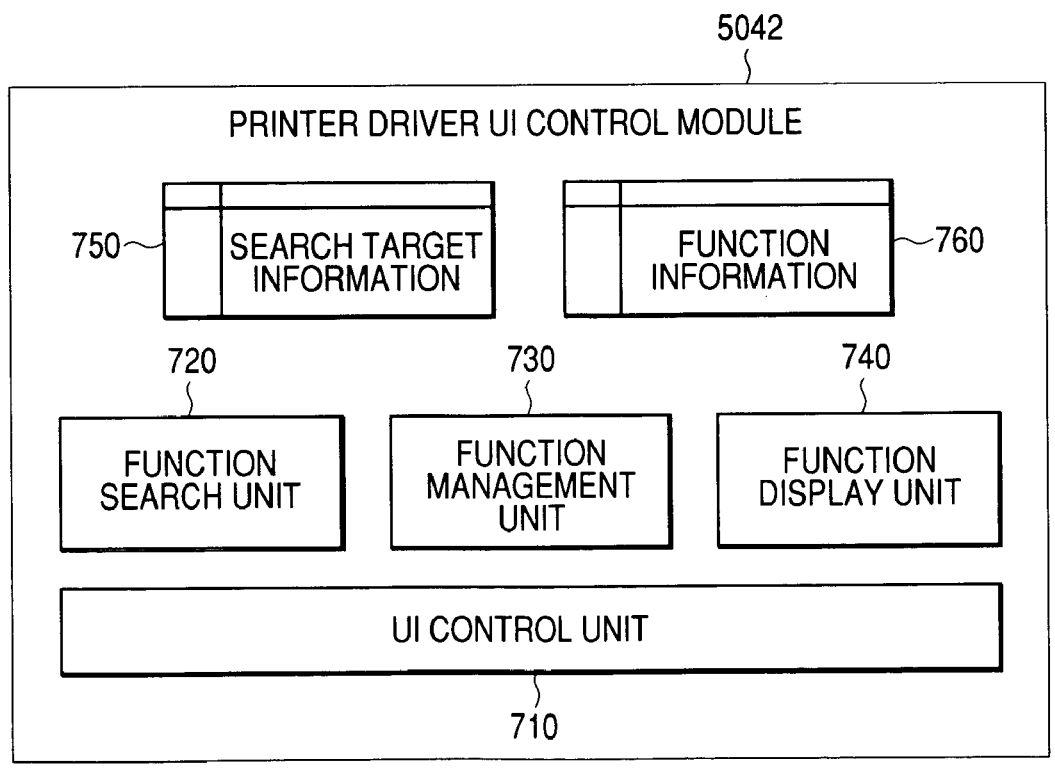
FIG. 5 shows the embodiment of the invention and is a conceptual diagram of a printer driver UI control module.

FIG. 5 is a conceptual diagram of the printer driver UI control module 5042 concerning the embodiment.

In the diagram, a UI control unit 710 controls user interfaces (UIs) such as print setting display screens 600 and 900 (refer to FIGS. 3 and 8), and a printer function setting display screen 800 (refer to FIG. 10), and the like.

Specifically speaking, the UI control unit 710 is a portion for performing display of the user interface (UI), adjustment of the set items which are displayed in the user interface (UI), construction of print setting data, and the like.

In the embodiment, search target information which is stored into a search target information list 750 and function information which is stored into a function information list 760 are managed.

The search target information which is stored into the search target information list 750 is information to specify a range where a function search unit 720 searches. Specifically speaking, the search target information is information regarding a location where the printer function has been stored, or the like.

The function information which is stored into the function information list 760 is information for an individual printer function. Specifically speaking, as shown in FIG. 6, the function information is a name of the function, a function ID, revision, a location, a related file name, a status, a corresponding model name, and the like. Such function information is collectively stored every printer function in the function information list 760.

The function information stored in the function information list 760 is updated by the function search unit 720 or a function management unit 730 and used for the display operation in a function display unit 740.

Those search target information and function information are information which is temporarily or permanently stored into a memory area in the RAM 102 or external memory (HD) 111 of the host computer 100 (host computer 1100) or the like.

The function search unit 720 searches for the printer function stored in a location described in the search target information in accordance with an instruction of the UI control unit 710. When a printer function is newly detected, necessary information is added to the function information list 760.

In accordance with the instruction of the UI control unit 710, the function display unit 740 presents the function information to the user and transmits an action such as addition, updating, deletion, or the like of a printer function which is designated by the user to the UI control unit 710.

In accordance with an instruction of the function display unit 740, the function management unit 730 plays a role for executing the addition, updating, and deletion of the target printer function. The function management unit 730 performs downloading, replacement, or deletion of a function providing related file as necessary.

Besides the above operations, the function management unit 730 executes operations such that various setting information is updated and the user interface (UI) which is specifically displayed upon execution of the printing is changed in accordance with a result of the updating, or the like so that a status change of the function providing related file is reflected to the printer setting information.

Another means for allowing the user to uniquely update and change the search target information can be also provided separately from those units.

The operation of the function search unit 720 will now be described in detail.

The function search unit 720 is activated at timing when a button provided on the user interface (UI) of the printer driver 5041 is clicked or it is activated on a background just before the printer function setting display screen 800 (refer to FIG. 10) to instruct the addition, updating, and deletion of the printer function is displayed. As another timing, the function search unit 720 can be also activated each time the user activates the user interface (UI) of the printer driver 5041, or the like.

Figure 7:
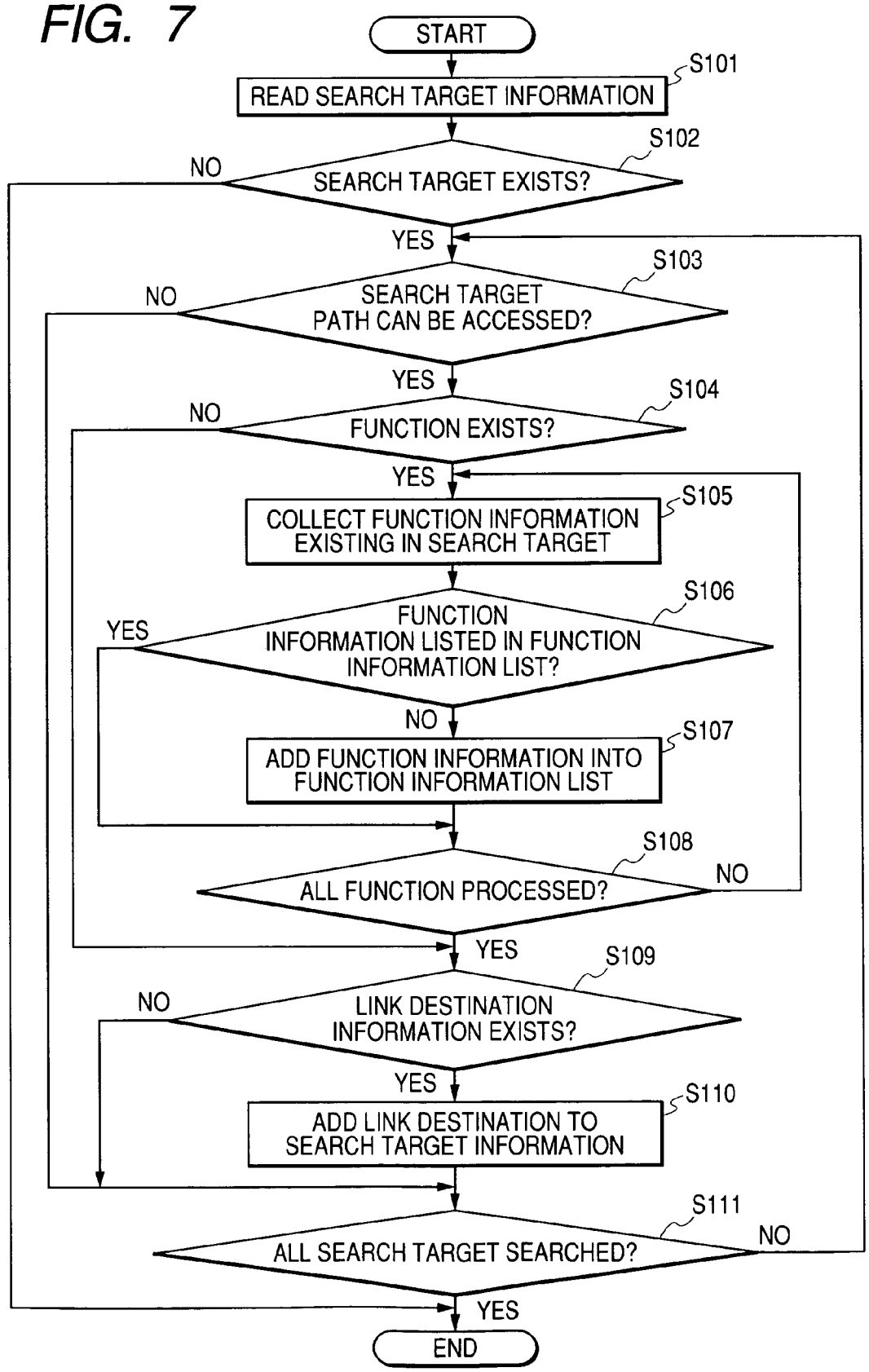
FIG. 7 shows the embodiment of the invention and is a flowchart showing processes in a function search unit.

FIG. 7 is a flowchart showing an example of the processes in the function search unit 720. The processes in the function search unit 720 will be described hereinbelow with reference to the flowchart.

When the function search unit 720 is activated, it is properly initialized and, thereafter, reads the search target information stored in the search target information list 750 (step S101).

If at least one search target (information regarding the location where the printer function has been stored) has been described in the read search target information, the processing routine advances to the next step. If no search target is described, the processing routine is finished (step S102).

If at least one search target has been described as a result of the discrimination in step S102, it is tried to access the search target to be processed. If it can be accessed, the next step follows. If it cannot be accessed, the processing routine advances to step S111, which will be explained hereinafter (step S103).

If the search target to be processed can be accessed as a result of the discrimination in step S103, whether the printer function exists in the present search target or not is discriminated. If at least one printer function exists, the next step follows. If no printer function exists, the processing routine advances to step S109, which will be explained hereinafter (step S104).

If at least one printer function exists as a result of the discrimination in step S104, the function information to be disclosed on the function information list 760 is collected from the printer functions existing in the search target (step S105).

If the collected function information is not disclosed on the function information list 760, the next step follows. If the function information of the same contents has already been disclosed on the function information list 760, the processing routine advances to step S108, which will be explained hereinafter (step S106).

If the function information collected in step S105 is not disclosed on the function information list 760 as a result of the discrimination in step S106, the function information already collected in step S105 is added to the function information list 760 (step S107).

If the function information for all of the printer functions existing in the location where it is at present the search target is collected, the next step follows. If the function information to be collected still remains, the processing routine is returned to step S105 and the information which is not collected yet is collected (step S108).

After that, whether information of the link destination (link destination information) exists or not is discriminated. If the link destination information exists as a result of the discrimination, the next step follows. If no link destination information exists, the processing routine advances to step S111, which will be explained hereinafter (step S109). Specific contents of the link destination information will be described hereinafter.

If the link destination information exists as a result of the discrimination in step S109, the link destination information is read out. Whether search target information corresponding to the read link destination information exists on the search target information list 750 or not is discriminated. If the search target information does not exist, it is added to the search target information list 750 (step S110).

After that, whether all of the printer functions existing in the search target disclosed on the search target information list 750 have been searched or not is discriminated. If all of them are not searched yet, the processing routine is returned to step S103 and the printer functions are searched from the residual search targets. If all of the printer functions existing in the search target disclosed on the search target information list 750 have been searched, the processing routine is finished (step S111).

The link destination information will now be described.

The link destination information denotes information regarding the location where the printer function is provided different from the search target that is referred to at present. Specifically speaking, the link destination information indicates the location where the printer function has been stored in a manner similar to the search target information.

By searching for the printer function via the link as mentioned above, the printer function can be searched in a wider range. However, such a mechanism has a possibility that a large amount of search which is made via the LAN 1400 or the Internet 1700 is caused. Therefore, in the case of constructing as mentioned above, it is desirable to construct so as to allow the user to validate or invalidate the search for the printer function which is performed via the link.

For example, even in the case where only the location of the server 1300 on the LAN 1400 has been disclosed on the search target information list 750 of the host computer 1100 shown in FIG. 4, if the link destination information showing the location of the Web server 1600 has been disclosed in the server 1300 on the LAN 1400, the printer function which is provided by the Web server 1600 can be also known.

Naturally, the search target range in the function search unit 720 is not limited to the range mentioned above but the printer functions in the host computer 1100 can be also used as search targets.

For example, even in the case where the printer function is provided by an electronic storing medium such as a CD or the like which is loaded into the host computer 1100, by properly editing the search target information list 750, the printer function can be also searched in a manner similar to that mentioned above.

Further, the printer function can be searched at a higher speed by executing the searching process of the printer function described by using FIG. 7 in a state where the target printer function has been downloaded into a proper memory area (for example, a memory area in the external memory (HD) 111) in the host computer 1100 from the server 1300 on the LAN 1400 or from the Web server 1600 on the Internet 1700. Further, by using such a construction, even when the network is interrupted, the search for the printer function can be executed.

As mentioned above, the function search unit 720 plays a role for searching for a location of the printer function existing in the location designated by the search target information list 750, reflecting a search result to the function information list 760, and in accordance with circumstances, updating the search target information list 750 by itself.

The operation of the function display unit 740 will now be described in detail.

The function display unit 740 plays a role for displaying the printer functions which have already been installed and the invalid printer functions searched by the function search unit 720 to the user and receiving an instruction for addition, updating, deletion, or the like to each printer function.

Each action received from the user is immediately reflected to the display screen (the printer function setting display screen 800), thereby enabling the user to confirm a status of the printer function in an interactive manner with the host computer 1100.

Figure 8:
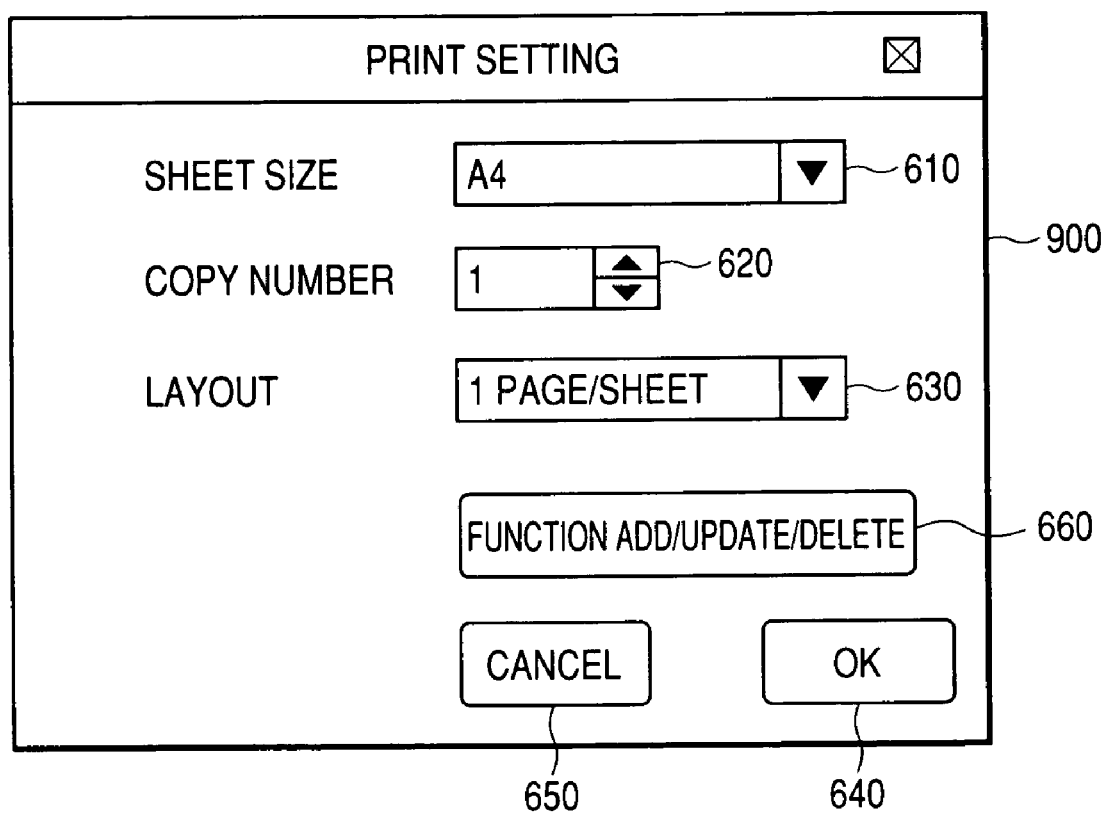
FIG. 8 shows the embodiment of the invention and is a diagram showing a display example of a print setting display screen provided with a switch for activating a function display unit.

FIG. 8 shows a display example of the print setting display screen having a switch (button) for activating the function display unit 740.

In the diagram, the print setting display screen 900 is obtained by adding a "function add/update/delete" button 660 to the print setting display screen 600 shown in FIG. 3. The function display unit 740 is activated by selecting the button 660.

As also described above, it is also possible that the function search unit 720 is activated in an interlocking manner with the selection of the button 660 and, thereafter, the function display unit 740 is activated.

Figure 9:
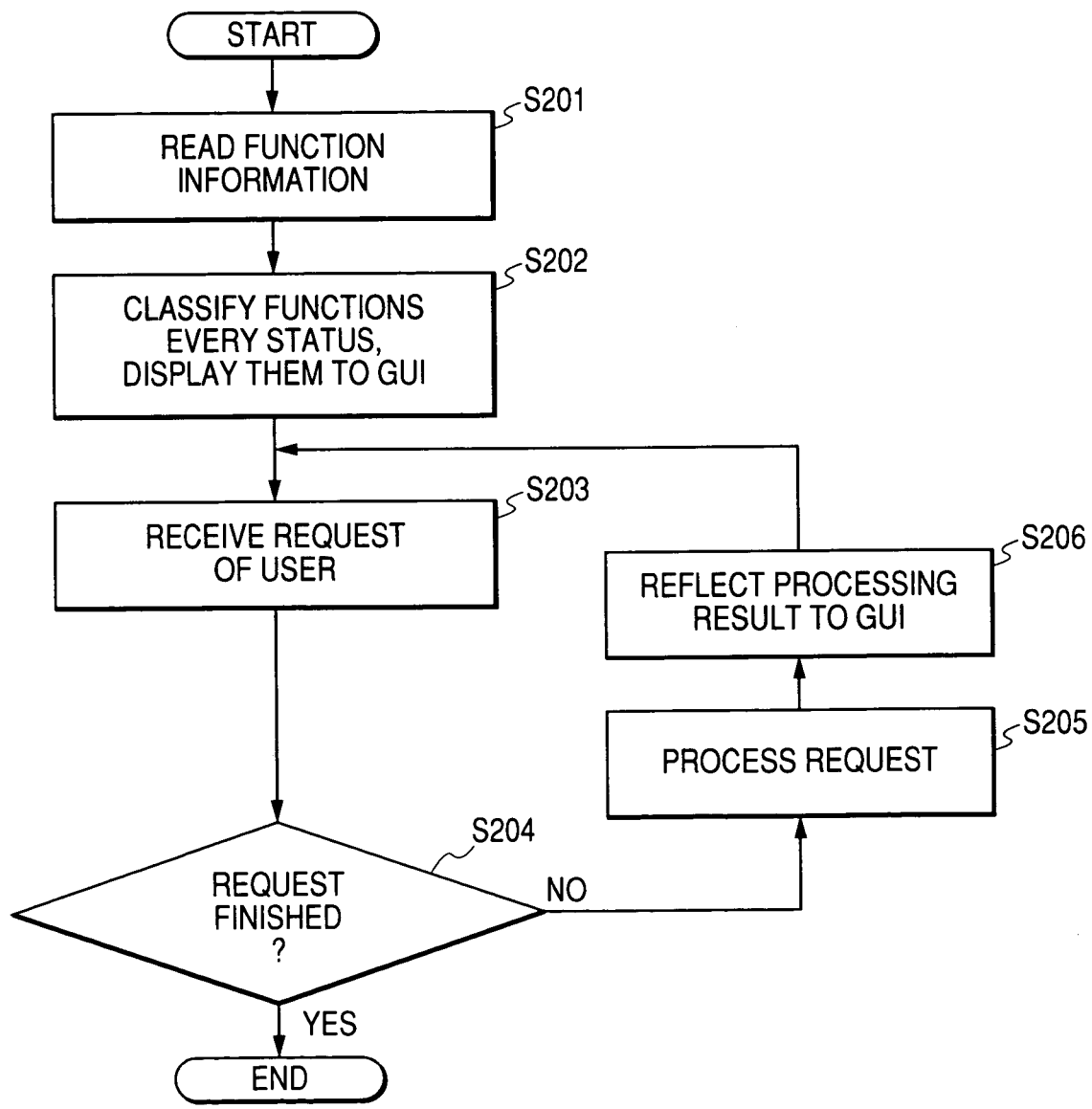
FIG. 9 shows the embodiment of the invention and is a flowchart showing processes in the function display unit.

FIG. 9 is a flowchart showing an example of processes in the function display unit 740. The processes in the function display unit 740 will be described hereinbelow with reference to the flowchart.

When the function display unit 740 is activated, it is properly initialized and first reads the function information on the function information list 760 (step S201).

Attention is paid to an item of "status" of the read function information and the printer functions are classified into the functions which are valid at present and the functions which are invalid at present. A result of the classification is displayed onto the printer function setting display screen 800 (refer to FIG. 10) (step S202).

Figure 10:
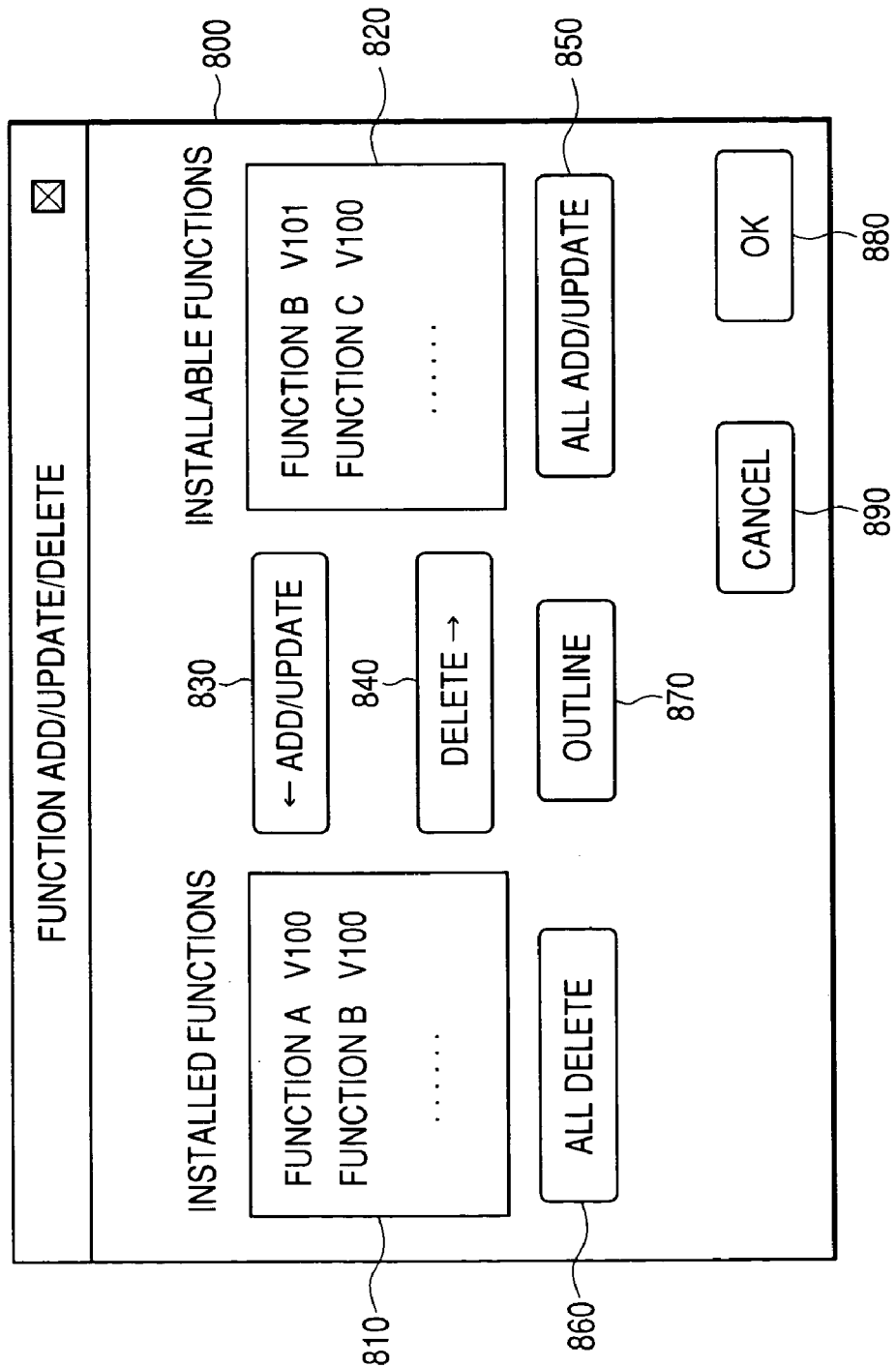
FIG. 10 shows the embodiment of the invention and is a diagram showing a display example of a printer function setting display screen.

FIG. 10 is a diagram showing a display example of the printer function setting display screen 800 which is displayed in step S202. As mentioned above, the printer function setting display screen 800 is a display screen to set the addition, updating, and deletion of the printer function.

Specifically speaking, the function information displayed in a display column 810 of "installed functions" on the printer function setting display screen 800 shown in FIG. 10 is function information regarding the printer functions whose statuses are "valid" on the function information list 760.

The function information displayed in a display column 820 of "installable functions" is function information regarding the printer functions whose statuses are "invalid" on the function information list 760.

In the display example of FIG. 10, to enable the user to easily understand the status of each printer function, "name of function" and "revision of function" in the function information are displayed in the columns 810 and 820, thereby displaying the status in which each printer function is.

If the user wants to obtain further detailed information regarding the printer function, he selects one of the function information listed in the display column 810 of "installed functions" or the display column 820 of "installable functions" and selects an "outline" button 870.

Thus, detailed information (function detailed information) regarding the printer function corresponding to the selected function information is displayed, thereby enabling the user to obtain detailed information such as outline and location of the printer function, further, file constructing the printer function, date and time of release of the printer function, and the like. Moreover, by clicking the "outline" button 870 in a state where the specific function has been selected from the display column 810 of "installed functions" or the display column 820 of "installable functions", the user can be notified of the outline information of the relevant function from the foregoing function information list 760.

If those function detailed information is displayed by using a tool chip (when a mouse cursor is moved to the relevant printer function or after the relevant printer function is selected, the left button of the mouse is clicked), it will be further convenient and preferable.

Explanation will be returned to FIG. 9. After the printer function setting display screen 800 is displayed to the user, the apparatus waits for each user action (step S203).

The user actions which are presumed here are the addition, updating, and deletion of the printer function and the end of the process.

If the action performed by the user is a click of a cancel button 890 in the printer function setting display screen 800 (step S204), the function display unit 740 finishes the process.

If the other action, that is, the action to add, update, or delete the printer function is performed, a step (step S205) of properly processing those actions (requests) and a step (step S206) of reflecting a result of the process in step S205 to the display of the printer function setting display screens (GUI) 800 are executed and, thereafter, the apparatus again waits for an action (request) from the user (step S203).

Step S205 of properly processing the actions (requests) is realized by calling the function management unit 730.

Processes of the function management unit 730 called in step S205 will now be described.

Figure 11:
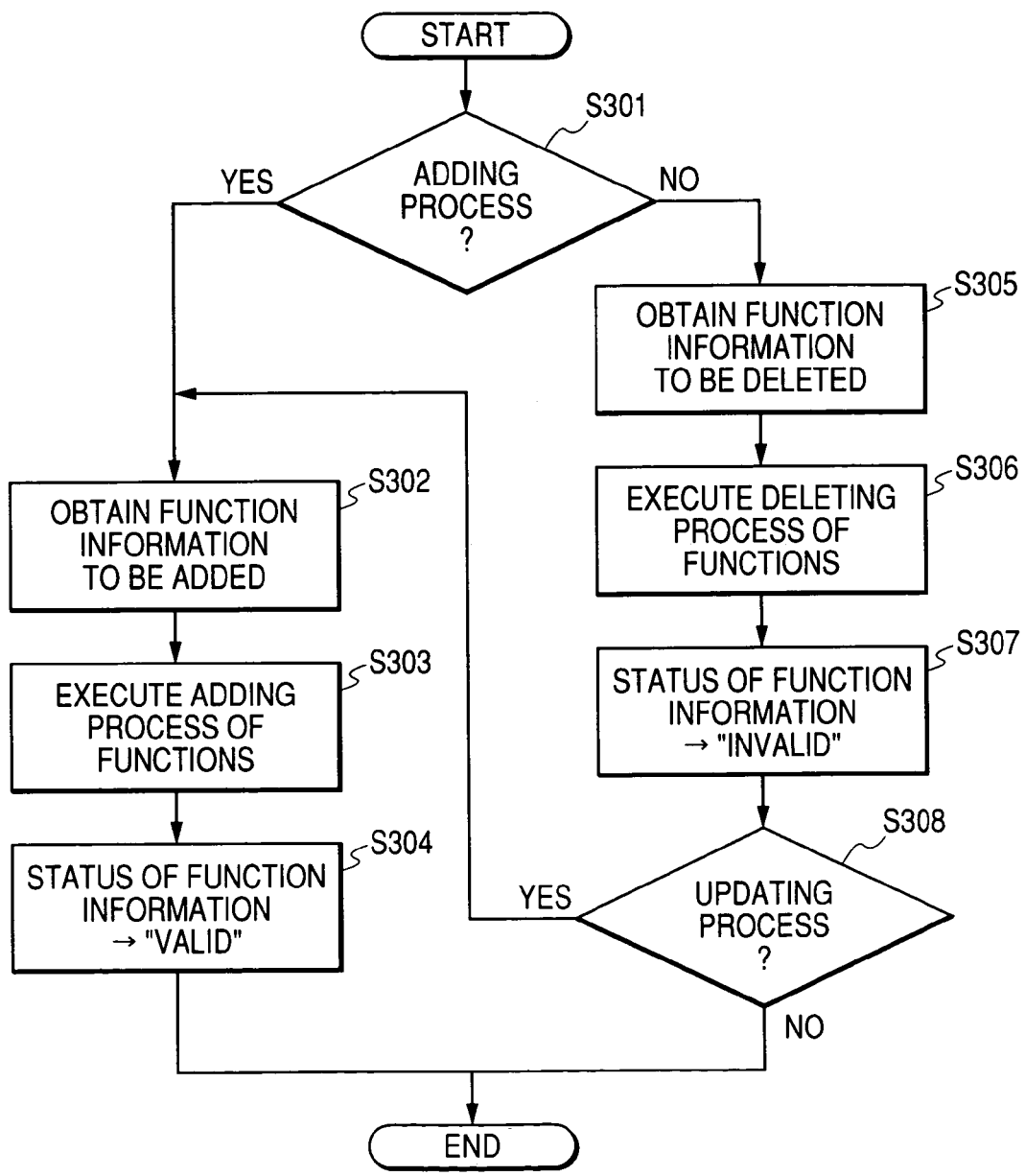
FIG. 11 shows the embodiment of the invention and is a flowchart showing processes in a function management unit.

FIG. 11 is a flowchart showing an example of the processes in the function management unit 730. The processes in the function management unit 730 will be described hereinbelow with reference to the flowchart.

First, whether the action requested by the user as mentioned above is "add" of the printer function or not is discriminated (step S301). This is because when the action requested by the user is "update" of the printer function, it is necessary to execute the "delete" process of the printer function first and, thereafter, execute the "add" process of the printer function.

If the action requested by the user is "add" of the printer function, various information necessary when the printer function is added is obtained from the function information list 760 or the like (step S302).

As information which is obtained here, there are a module to realize the printer function to be added, information regarding a rule upon obtaining (information regarding a calling rule), information showing how the printer function to be added is reflected to print setting information, and the like.

Further, information regarding association with other printer functions, information showing by which layout the newly added printer functions are displayed on the printer function setting display screen (GUI display screen) 800, information to decide attributes or the like of the newly added printer functions, information regarding items to be set and executed in dependence on the corresponding printer (apparatus type) 1200, and the like are also included in the information which is obtained in step S302.

After that, the specific adding process of the printer function is executed (step S303).

This process is a process for adding the relevant printer function to the existing printer driver UI control module 5042 and printer driver 5041 and is executed as follows.

(Fetching of the Module to Realize the Printer Function to be Added)

Among the printer functions, there is a function which needs to be certainly executed in the host computer 1100 which executes the printing process. There is also a printer function which can be processed while leaving its substance on the other server 1300 or 1600.

As mentioned above, by considering that there are various locations of the plug-in module 1201 or 1202 (execution module) in dependence on the attributes of the printer function, the link is set so that those printer functions can be easily referred to from the host computer 1100. The plug-in module 1201 or 1202 (execution module) are fetched on the basis of a result of the link setting. At this time, there is also a case where the plug-in module 1201 or 1202 (execution module) is downloaded onto a local hard disk or the like in the host computer 1100 as necessary and fetched.

(Fetching of the Calling Rule)

A process for installing timing to call the newly added printer function, information which is necessary when the printer function is called, and the like into the existing printer driver 5041 and printer driver UI control module 5042 is executed.

When the fetching process of the calling rule is executed, the printer driver 5041 and printer driver UI control module 5042 can provide the information which is necessary when the printer function is called at the timing for the installation to the plug-in module management unit 1204 (additional function processing module) side.

Those information can be also collected from the plug-in module management unit 1204 (additional function processing module) side via the existing interface on the side of the printer driver 5041 and printer driver UI control module 5042 in dependence on circumstances.

It is also possible to regard the plug-in modules 1201 and 1202 and the plug-in module management unit 1204 to be identical and provide and collect the information which is necessary when the printer function is called.

(Reflection of the Printer Function to the Print Setting Information)

The printer driver UI control module 5042 forms the print setting information and sends it to the printer driver 5041, thereby enabling the added printer function to be realized by the printer driver 5041.

When the new printer function is added to the printer driver 5041, it is necessary to certainly disclose the status of this printer function, its option, and the like into the print setting information. A process for enabling those set items to be interpreted by the printer driver UI control module 5042 and the printer driver 5041 is executed here.

(Installation of Processes Associated with Other Printer Functions)

Since various functions are realized in the printer driver UI control module 5042, in order to avoid contradiction or the like on the setting among a plurality of printer functions, it is necessary to sequentially revise the set items on the basis of one predetermined rule.

When the revision of each set item is named as "rule", it is important that the "rule" for the newly added printer function is executed in an allocated priority. A process for installing the "rule" for the newly added printer function into a designated layer is executed here.

(Adding Process to GUI)

If the newly added printer function needs a user interface (UI), it is necessary to set how display information of the newly added printer function is arranged onto the GUI. It is also necessary to set what kinds of control and selection items should be presented onto the GUI. To accomplish those setting processes, an operation to merge the existing GUIs and the GUI of the newly added printer function is executed.

(Fetching of Apparatus Type Dependence Information)

There is also considered a case where restriction items occur in dependence on a target apparatus type (printer 1200) to which the newly added printer function adapts. Therefore, if it is necessary to notify the existing printer driver 5041 and printer driver UI control module 5042 of the apparatus type dependence information for the newly added printer function, a process for adding or replacing the apparatus type dependence information is executed.

The above explanation relates to the main processes regarding the addition of the printer function. As other processes, it is necessary to execute all necessary processes in step S303 so that the printer driver 5041 and printer driver UI control module 5042 can smoothly process the newly added printer function.

Explanation will be returned to FIG. 11. When the adding process (process in step S303) of the printer function as mentioned above is normally finished, the function management unit 730 refers to the function information list 760 and changes the item of "status" of the printer function to which the adding process has just been executed to "valid" (step S304). The processing routine is finished.

The above explanation relates to the operation of the function management unit 730 for "add" of the printer function.

Processes of the function management unit 730 for "update" or "delete" of the printer function will now be described. If it is determined in step S301 that the action requested by the user is "update" or "delete" of the printer function, various information necessary to delete the printer function is obtained from the function information list 760 or the printer driver 5041 (to which the printer function has already been added) and printer driver UI control module 5042 (step S305). The information which is obtained here is information which is used for returning the adding process of the printer function described above (process executed in step S303) to the original state.

After that, the specific deleting process of the printer function is executed (step S306).

The process in this step denotes a process for returning the adding process of the printer function described above (process executed in step S303) to the original state.

That is, processes for abandoning the foregoing function realizing module, the rule, and further, the link with the apparatus type dependence information or the like and recovering the calling procedure, setting information, and further, the GUI and the like to the statuses before the printer function is added are executed.

After completion of those processes, the function management unit 730 refers to the function information list 760 and changes the item of "status" of the printer function to which the deleting process has just been executed to "invalid" (step S307).

After that, whether the action requested by the user is "update" of the printer function or not is discriminated (step S308). If it is the "update" process of the printer function, step S302 follows and the adding process of the printer function mentioned above is executed. If the action requested by the user is other than "update" of the printer function (that is, "delete" of the printer function), the processing routine is finished.

The above explanation relates to the processes in the function management unit 730.

Explanation will be returned to FIG. 9. When the foregoing processes for the printer function using the function management unit 730 are completed in step S205, the processing routine advances to step S206 of reflecting a processing result to the printer function setting display screen (GUI) 800.

At this point of time, the processes of "add", "update", and "delete" of the printer function have been reflected to all of the printer driver 5041 and printer driver UI control module 5042 and the processing result has been written into the item of "status" on the function information list 760.

The function display unit 740 again reads the function information list 760, pays attention to the item of "status", classifies the printer functions into the functions which are valid at present and the functions which are invalid at present, and displays a result of the classification onto the printer function setting display screen 800 (step S206).

After that, the apparatus waits for the request from the user on the printer function setting display screen 800 shown in FIG. 10.

Finally, the operation of the printer function setting display screen (GUI) 800 in the function display unit 740 will be described.

To add the printer function on the printer function setting display screen (GUI) 800 shown in FIG. 10, the user clicks an "add/update" button 830 in a state where a desired printer function has been selected from the display column 820 of "installable functions".

On the basis of the above operation, the adding process of the relevant printer function is properly executed in the function management unit 730. After that, the printer function is validated. To reflect such a result, the display information (function information) for the validated printer function is moved from the display column 820 of "installable functions" to the display column 810 of "installed functions".

In the case of deleting the printer function, the user also clicks a "delete" button 840 in a state where a desired printer function has been selected from the display column 810 of "installed functions" in a manner similar to that mentioned above.

On the basis of the above operation, the deleting process of the relevant printer function is properly executed in the function management unit 730. After that, the printer function is invalidated. To reflect such a result, the display information (function information) for the invalidated printer function is moved from the display column 810 of "installed functions" to the display column 820 of "installable functions".

In the case of updating the printer function, the operations of "add" and "delete" of the printer function mentioned above are executed. An example in which "function B" shown in FIG. 10 is updated from "V100" to "V101" will be described. When the user clicks the "add/update" button 830 in a state where the relevant printer functions displayed in either one or both of the display column 810 of "installed functions" and the display column 820 of "installable functions", the printer function B whose revision is "V100" ("function B V100") is invalidated.

The display information ("function B V100") for this printer function is moved from the display column 810 of "installed functions" to the display column 820 of "installable functions". The printer function B whose revision is "V101" ("function B V101") is validated and the display information ("function B V101") for this printer function is moved from the display column 820 of "installable functions" to the display column 810 of "installed functions".

When an "all add/update" button 850 in the printer function setting display screen 800 shown in FIG. 10 is clicked, control is made so that the "add" process or the "update" process is sequentially executed for each function information displayed (listed) in the display column 820 of "installable functions". When an "all delete" button 860 is clicked, control is made so that the "delete" process is sequentially executed for each function information displayed (listed) in the display column 810 of "installed functions".

As mentioned above, according to the embodiment, the function information existing in a range of the search targets disclosed on the search target information list 750 in the printer driver UI control module 5042 which is made operative by the host computer 100 is obtained and written into the function information list 760, (a part of) the function information written onto the function information list 760 is displayed in the display columns 810 and 820 of the printer function setting display screen 800, the instruction of the addition, updating, and deletion of the function corresponding to the displayed function information is received, and the addition, updating, and deletion of the function are executed in accordance with the received instruction.

Thus, the addition, updating, and deletion of the function can be executed by using the plug-in modules 1201 and 1202 connected to the driver main body module 1203.

Therefore, the original printer driver itself (driver main body module 1203) is not changed at all but the printer function can be newly added, the existing printer function can be replaced with the new printer function and updated, or the deletable printer functions can be deleted.

This means that while the change portion of the printer driver is held to a minimum amount, the addition, updating, and deletion of the printer function can be realized and differences among the existing printer drivers, the printer driver obtained after the addition, updating, or deletion of the printer function was performed, and the print control apparatus in which those printer drivers have been installed can be minimized. Therefore, a situation that the user receives the unexpected disadvantage due to the addition, updating, and deletion of the printer function as in the conventional apparatus can be prevented as much as possible.

Further, since the addition, updating, and deletion of the printer function can be instructed by using the printer function setting display screen 800, the instruction of the addition, updating, and deletion of the printer function can be called onto the display 110 as an example of the display unit of the host computer 100 as an example of the print control apparatus from a user interface program of the printer driver which is a display control program to control the display. It is possible to enable the user to easily execute the operation for executing the addition, updating, and deletion of the printer functions.

(Other Embodiments of the Invention)

The invention also incorporates a case where program codes of software to realize the functions of the embodiment mentioned above are supplied to a computer in an apparatus or a system connected to the foregoing various devices so as to make the various devices operative in order to realize the functions of the embodiment and the various devices are made operative in accordance with a program stored in the computer (a CPU or an MPU) of the system or the apparatus.

In such a case, the program codes themselves of such software realize the functions of the embodiment mentioned above. The program codes themselves and means for supplying the program codes to the computer, for example, a recording medium in which the program codes have been stored construct the invention. As a recording medium to store the program codes, for example, a flexible disk, a hard disk, an optical disk, a magnetooptic disk, a CD-ROM, a magnetic tape, a non-volatile memory card, a ROM, or the like can be used.

Naturally, the program codes are also incorporated in the embodiment of the invention in not only the case where the computer executes the supplied program codes, so that the functions of the embodiment mentioned above are realized but also the case where the program codes cooperate with an OS (Operating System), other application software, or the like which is operating in the computer and the functions of the embodiment mentioned above are realized.

Further, the invention also incorporates a case where the supplied program codes are stored into a memory provided for a function expanding board of the computer or a function expanding unit connected to the computer, thereafter, a CPU or the like provided for the function expanding board or the function expanding unit executes a part or all of actual processes on the basis of instructions of the program codes, and the functions of the embodiment mentioned above are realized by those processes.

According to the invention as described above, when the function designated by the user is realized in an interlocking manner with the peripheral devices, the function information regarding the functions which have already been installed and the function information regarding functions which are not installed yet are displayed, the instruction of the addition, updating, and deletion of the function is received, and the addition, updating, and deletion of the function are executed in accordance with the received instruction. Therefore, the addition, updating, and deletion of the function can be properly executed.

What is claimed is:

1. A peripheral device control apparatus for realizing a function designated by the user by controlling a peripheral device, comprising:

installation function information obtaining means for obtaining installation function information showing what functions have been installed or what functions are not installed among functions which are realized by communicating with said peripheral device;

display control means for controlling a process to display the installed functions or/and the functions which are not installed so that they can be discriminated by using the installation function information obtained by said installation function information obtaining means;

receiving means for receiving an instruction of addition, updating, or deletion of the functions displayed by the displaying process which is controlled by said display control means; and function managing means for executing at least one of a process to add and validate the function received by said receiving means, a process to delete and invalidate said designated function, and a process to update the function as an updating target to another designated function and validate said another designated function in accordance with the instruction received by said receiving means.

2. An apparatus according to claim 1, wherein said installation function information obtaining means searches for the installation function information and obtains it.

3. An apparatus according to claim 2, wherein said installation function information obtaining means searches for said functions with respect to other information apparatuses connected via a network as targets.

4. An apparatus according to claim 2, wherein said installation function information obtaining means searches for said functions with respect to removable media, as a target, connected to an information apparatus in which said peripheral device control apparatus operates.

5. An apparatus according to claim 1, wherein on the basis of the instruction received by said receiving means, said function managing means executes operations including obtainment, updating, and deletion of a plug-in program having the designated function.

6. An apparatus according to claim 1, wherein said display control means separately displays function information regarding the functions which have already been validated and function information regarding the functions which have already been invalidated.

7. An apparatus according to claim 1, wherein said receiving means displays a list of said functions which have already been installed and a list of said functions which are not installed and, further, displays an instructing unit for instructing the adding operation of the function, the updating operation of the function, or the deleting operation of the function, and said instructing unit allows a specific one or a plurality of functions to be selected from the list of said functions which have already been installed or the list of said functions which are not installed and can instruct one of the operations of the deletion, the updating, and the addition.

8. An apparatus according to claim 1, wherein said receiving means has both or one of an instructing unit which can instruct to delete in a lump the functions displayed in a list of said functions which have already been installed and an instructing unit which can instruct to add or update in a lump the functions displayed in a list of said functions which are not installed.

9. An apparatus according to claim 8, wherein said receiving means has an instructing unit for requesting to provide outline information of the functions displayed on the list of said functions which have already been installed or the list of said functions which are not installed to the user.

10. An apparatus according to claim 1, wherein said display control means displays a valid function display column for displaying the function information regarding the installed functions obtained by said installation function information obtaining means and an invalid function display column for displaying the function information regarding the uninstalled functions obtained by said installation function information obtaining means onto a printer function setting display screen, when the functions corresponding to the function information displayed in said valid function display column are updated or deleted and invalidated by said function managing means, said display control means moves and displays the relevant function information onto said invalid function display column, and when the functions corresponding to the function information displayed in said invalid function display column are added or updated and validated by said function managing means, said display means moves and displays the relevant function information onto said valid function display column.

11. A peripheral device control method of realizing a function designated by the user by controlling a peripheral device, comprising:

an installation function information obtaining step of obtaining installation function information showing what functions have been installed or what functions are not installed among functions which are realized by communicating with said peripheral device;

a display control step of controlling a process to display the installed functions or/and the functions which are not installed so that they can be discriminated by using the installation function information obtained in said installation function information obtaining step;

a receiving step of receiving an instruction of addition, updating, or deletion of the functions displayed by the displaying process which is controlled by said display control step; and a function managing step of executing at least one of a process to add and validate the function received in said receiving step, a process to delete and invalidate said designated function, and a process to update the function as an updating target to another designated function and validate said another designated function in accordance with the instruction received in said receiving step.

12. A method according to claim 11, wherein in said installation function information obtaining step, the installation function information is searched and obtained.

13. A method according to claim 12, wherein in said installation function information obtaining step, said functions are searched with respect to other information apparatuses connected via a network as targets.

14. A method according to claim 12, wherein in said installation function information obtaining step, said functions are searched with respect to removable media connected, as a target, to an information apparatus in which said peripheral device control method operates.

15. A method according to claim 11, wherein in said function managing step, operations including obtainment, updating, and deletion of a plug-in program having the designated function are executed on the basis of the instruction received in said receiving step.

16. A method according to claim 11, wherein in said display control step, function information regarding the functions which have already been validated and function information regarding the functions which have already been invalidated are separately displayed.

17. A method according to claim 11, wherein in said receiving step, a list of said functions which have already been installed and a list of said functions which are not installed are displayed and, further, an instructing unit for instructing the adding operation of the function, the updating operation of the function, or the deleting operation of the function is displayed, and said instructing unit allows a specific one or a plurality of functions to be selected from the list of said functions which have already been installed or the list of said functions which are not installed and can instruct one of the operations of the deletion, the updating, and the addition.

18. A method according to claim 11, wherein said receiving step has both or one of an instructing unit which can instruct to delete in a lump the functions displayed in a list of said functions which have already been installed and an instructing unit which can instruct to add or update in a lump the functions displayed in a list of said functions which are not installed.

19. A method according to claim 18, wherein said receiving step has an instructing unit for requesting to provide outline information of the functions displayed on the list of said functions which have already been installed or the list of said functions which are not installed to the user.

20. A method according to claim 11, wherein
in said display control step, a valid function display column for displaying the function information regarding the installed functions obtained in said installation function information obtaining step and an invalid function display column for displaying the function information regarding the uninstalled functions obtained in said installation function information obtaining step are displayed on a printer function setting display screen,
when the functions corresponding to the function information displayed in said valid function display column are updated or deleted and invalidated in said function managing step, the relevant function information is moved and displayed onto said invalid function display column, and
when the functions corresponding to the function information displayed in said invalid function display column are added or updated and validated in said function managing step, the relevant function information is moved and displayed onto said valid function display column.

21. A computer-readable storing medium which stores a control program for realizing a function designated by the user by controlling a peripheral device, wherein said control program allows a computer to execute:
an installation function information obtaining step of obtaining installation function information showing what functions have been installed or what functions are not installed among functions which are realized by communicating with said peripheral device;
a display control step of controlling a process to display the installed functions or/and the functions which are not installed so that they can be discriminated by using the installation function information obtained in said installation function information obtaining step;
a receiving step of receiving an instruction of addition, updating, or deletion of the functions displayed by the displaying process which is controlled by said display control step; and
a function managing step of executing at least one of a process to add and validate the function received in said receiving step, a process to delete and invalidate said designated function, and a process to update the function as an updating target to another designated function and validate said another designated function in accordance with the instruction received in said receiving step.

22. A peripheral device control apparatus for realizing a function designated by the user by controlling a peripheral device, comprising:
installation function information obtaining device for obtaining installation function information showing what functions have been installed or what functions are not installed among functions which are realized by communicating with said peripheral device;
display control device for controlling a process to display the installed functions or/and the functions which are not installed so that they can be discriminated by using the installation function information obtained by said installation function information obtaining device;
receiving device for receiving an instruction of addition, updating, or deletion of the functions displayed by the displaying process which is controlled by said display control device; and
function managing device for executing at least one of a process to add and validate the function received by said receiving device, a process to delete and invalidate said designated function, and a process to update the function as an updating target to another designated function and validate said another designated function in accordance with the instruction received by said receiving device.

* * * * *

UNITED STATES PATENT AND TRADEMARK OFFICE
CERTIFICATE OF CORRECTION

PATENT NO. : 7,232,267 B2  
APPLICATION NO. : 10/825229  
DATED : June 19, 2007  
INVENTOR(S) : Uchida Page 1 of 1

It is certified that error appears in the above-identified patent and that said Letters Patent is hereby corrected as shown below:

On the Title Page Item (30)  
Insert: -- (30) Foreign Application Priority Data

Apr. 25, 2003 (JP) ................................... 2003-122608 --.

Signed and Sealed this

Fifteenth Day of April, 2008

JON W. DUDAS  
*Director of the United States Patent and Trademark Office*